June 19, 1962    L. R. ZUMWALT    3,039,944
FUEL ELEMENT
Filed May 13, 1959    2 Sheets-Sheet 1

Inventor
LLOYD ROBERT ZUMWALT
By Soans, Anderson, Luedeka & Fitch
Atty's

June 19, 1962 L. R. ZUMWALT 3,039,944
FUEL ELEMENT
Filed May 13, 1959 2 Sheets-Sheet 2

Inventor
LLOYD ROBERT ZUMWALT
By
Soans, Anderson, Luedeka & Nitch
Attys

United States Patent Office 3,039,944
Patented June 19, 1962

3,039,944
FUEL ELEMENT
Lloyd Robert Zumwalt, La Jolla, Calif., assignor, by mesne assignments, to the United States of America as represented by the United States Atomic Energy Commission
Filed May 13, 1959, Ser. No. 812,936
12 Claims. (Cl. 204—154.2)

The present invention relates generally to the construction of fuel elements, and more particularly relates to improved fuel elements for use in nuclear reactors, said fuel elements having reduced permeability to the transmission of fission products, and to a method of making the improved fuel elements.

One form of fuel element for a nuclear reactor comprises a body or compact of fissile material or a mixture of fissile and fertile materials, with or without various other substances, including moderating materials, the body being enclosed in one or more containers adapted to prevent the escape of fission products therefrom. Fission product traps may be employed to trap and remove those fission products which have succeeded in migrating from the fuel body through the surrounding containers.

The problem of containing volatile and/or diffusible fission products, particulary radioactive fission products, within a fuel element to prevent contamination of the remainder of the reactor core and reactor system is especially serious in connection with high temperature nuclear reactors, particularly where carbon, in the form of graphite, is employed as the structural material for the container or containers in which the fuel material is deposited. In this connection, although graphite and other forms of carbon have certain advantages as structural materials for a nuclear fuel element, they are relatively porous and have a high permeability to the passage of fission products.

Accordingly, various attempts have been made in the past to decrease the permeability of graphite and other forms of carbon to fission products. In one particularly desirable form of construction of a nuclear fuel element the body or compact of fuel is enclosed in a graphite container, having reduced permeability, which container is fitted with a closure brazed or otherwise fastened in place to provide a substantially gas-tight seal around the body or compact of fuel. The graphite container enclosing the fuel body is then disposed within an outer sleeve or container of graphite of reduced permeability, the combination of the graphite containers and the fuel body comprising the fuel element.

However, the present day reactor-grade so-called "impermeable graphites," still have a substantial percentage of pore volume (and a large number of these pores are interconnected), so that they are still relatively permeable to the passage of fission products. This is the case even when the graphite or other type of carbon is fabricated into an extremely dense form. Such densified graphite elements usually permit the passage of small amounts of radioactive diffusible solids and/or gases and, accordingly, are not entirely satisfactory in use.

Accordingly, in fuel element structures of the type described fabricated from reactor-grade "impermeabilized" graphite, volatile fission products still have a tendency to migrate through the "impermeabilized" graphite to the space between the inner container and the outer sleeve. From this space, the fission products may then migrate through the "impermeabilized" graphite sleeve and into the reactor coolant within the reactor core. Once the fission products enter the reactor coolant, they are rapidly circulated throughout the reactor core and portions of the remainder of the reactor system, contaminating it to the extent that the fission products are radioactive.

Various improved techniques have recently been discovered for greatly decreasing the porosity and fission product permeability of structural graphite, by coating or otherwise treating the surface thereof, for example those techniques which are disclosed in copending application Serial No. 784,074 to David H. Gurinsky, filed December 31, 1958, now Patent No. 2,995,471 and entitled "Improved Graphite Product"; application Serial No. 784,073, to Massoud T. Simmad, filed December 31, 1958, and entitled "Carbon Product"; application Serial No. 784,071, to Walter V. Goeddel and Massoud T. T. Simmad, filed December 31, 1958, now Patent No. 3,001,238 and entitled "Method of Making Carbon Bodies"; application Serial No. 784,069 to Walter V. Goeddel and Robert J. Pyle, filed December 31, 1958, and entitled "Improved Graphite Product"; and application Serial No. 784,068 to Robert J. Pyle and Gerald L. Allen, filed December 31, 1958, and entitled "Improved Graphite Product."

The present invention relates to further improvements in the containment of volatile and/or diffusible fission products, particularly radioactive fission products, within a nuclear fuel element. In accordance with the present invention, a region of greatly reduced permeability to the passage of fission products is established between the nuclear fuel and the shell of the fuel element. In addition, this region may be self-sealing to reduce the danger of radiation damage due to cracking of the nuclear fuel containers. Various other advantages of the construction are described in detail hereinafter.

Accordingly, it is an object of the present invention to provide improved containment of volatile and/or diffusible fission products within a nuclear fuel element. A more specific object of the present invention is to provide an improved fuel element having a reduced permeability to the passage of volatile and diffusible fission products therethrough, and an improved method of fabricating the same.

Other objects and advantages of the present invention will become known by reference to the following detailed description of the invention and to the accompanying drawings of which:

Figure 1:
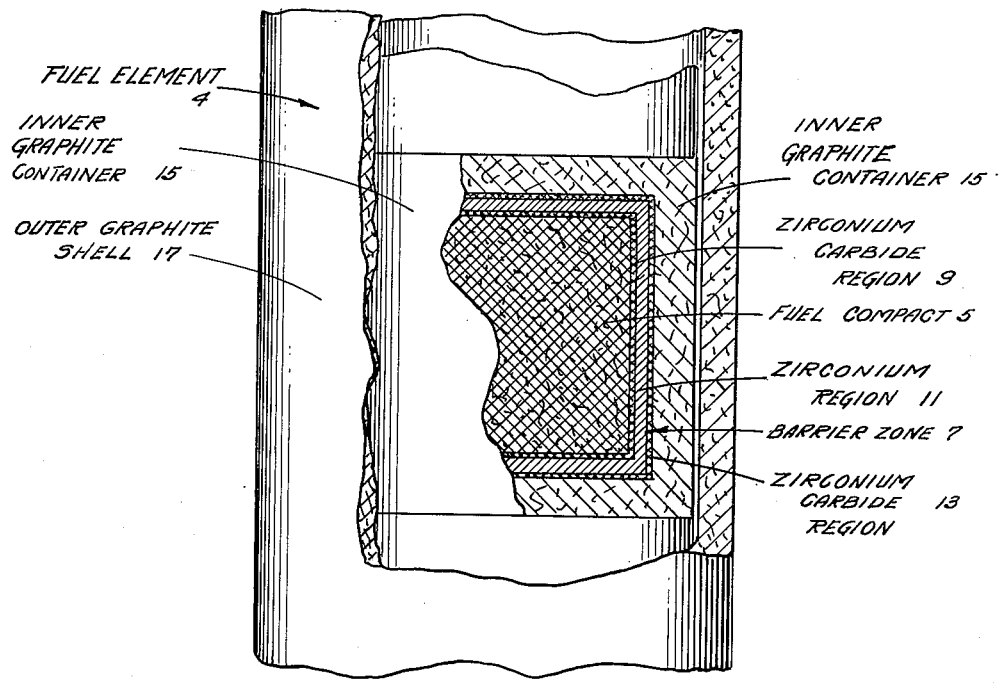
FIGURE 1 is a schematic representation of a side elevational view of a portion of a nuclear fuel element embodying certain features of the present invention, parts being broken away to reveal the internal construction thereof.

The present invention includes the formation within a nuclear fuel element and external of the source of fission product emission, of a protective zone comprising two or more regions containing zirconium carbide, separated by interposing regions containing zirconium metal. The metal may be substantially pure zirconium or a eutectic mixture or alloy containing a minor proportion (for example 20 weight percent) of niobium. Preferably, pure zirconium is utilized. It will be understood that where the zirconium-niobium eutectic mixture or alloy is utilized, the zirconium carbide-containing regions also contain niobium carbide and the zirconium-containing region also contains niobium. Accordingly, in such event the protective zone will comprise zirconium carbide and niobium carbide-zirconium and niobium-zirconium carbide and niobium carbide.

It will therefore be understood that the term zirconium-containing region may include niobium as well as zirconium and that either or both of the zirconium carbide-containing regions may include niobium carbide as well as zirconium carbide. The zirconium carbide-containing zirconium-containing-zirconium carbide-containing protective zone has been found to be a very effective barrier against the permeation of fission products by diffusion or volatilization therethrough. The barrier zone is preferably located within a nuclear fuel element comprising a fuel compact around which are disposed one or more containers of structural graphite. However, it should be understood that the fuel elements may also be fabricated in any other suitable manner and from other materials, so long as the zirconium carbide-containing-zirconium-containing-zirconium carbide-containing zone is disposed between the nuclear fuel and the environment surrounding the fuel element, that is, the coolant, when the fuel element is disposed in the reactor core, so that the protective zone acts as a barrier to the migration of fission products from the fuel to the coolant.

The production of the indicated zone of greatly reduced permeability to the passage of fission products may be accomplished by a method which comprises disposing zirconium metal or alloy with niobium between and adjacent two carbon-containing sources in the path of migration of the fission products from the nuclear fuel. (When reference is made to graphite or to carbon, it should be understood that the several forms of carbon are contemplated.) Zirconium carbide is then formed at the interface between the carbon-containing sources and the zirconium (and to some extent in immediately adjacent areas) by subjecting the zirconium to a carburizing or brazing temperature, for example, between about 1800° C. and about 1900° C. under suitable conditions, including a non-oxidizing atmosphere, preferably an inert atmosphere, and over a suitable interval of time. The same is true of the niobium, where present with the zirconium.

The desired barrier zone containing zirconium carbide-zirconium-zirconium carbide is formed in a manner so as to be free of cracks. Moreover, this barrier zone, due to the creep properties of zirconium, has a suitable amount of elasticity at the usual operating temperatures of the fuel element. Accordingly, it is durable and resistant to structural failure.

In addition, the barrier zone has the aforementioned advantage of being self-healing. In this connection, if during operation of the nuclear reactor cracks should develop in either of the carbide boundary regions of the barrier zone, zirconium metal or a eutectic mixture of zirconium and niobium will tend to flow into the cracks and form carbide therein by contact with the carbide and/or the carbon of the surrounding area under the operating conditions of the reactor, so as to seal the cracks.

It has been found that carbon diffuses relatively slowly through zirconium carbide. Even at nuclear reactor operating temperatures of approximately 1800° C. that is, at zirconium and niobium carburizing temperatures, migration of carbon through the zirconium carbide-containing zone is relatively slow and, accordingly, the desired barrier zone is relatively stable at the usual fuel operating temperatures for the nuclear reactor.

Now referring to the accompanying drawings, FIGURE 1 is a schematic representation of a portion of a nuclear fuel element illustrating certain features of the present invention, portions being broken away to show the internal construction.

A portion of a nuclear reactor fuel element 4 is illustrated in FIGURE 1. A fuel compact 5 is disposed within the fuel element 4, around which fuel compact is positioned a protective barrier zone 7. The protective barrier zone 7 comprises an inner zirconium carbide region 9 adjacent to and integral with the outer surface of the compact 5, a centrally disposed region 11 of zirconium integral with the outer surface of the inner zirconium carbide region 9 and an outer zirconium carbide region 13 which surrounds and is integral with the outer surface of the zirconium region 11, as schematically illustrated in FIGURE 1. The zirconium carbide region 13 is in turn integral with and surrounded by an inner graphite container 15 which encloses the fuel compact and barrier zone. A plurality of the inner graphite containers 15 with their associated fuel compacts may be loosely disposed in stacked relation within an outer graphite shell 17 of the fuel element 4.

Referring again to FIGURE 1, the fuel compact 5 may be of any suitable type, such as those fully described in copending United States application, Serial No. 753,-950 filed August 8, 1958, now U.S. Patent No. 3,010,889, to Peter Fortescue and Lloyd R. Zumwalt and entitled "Fuel Element." Briefly, the fuel compact may comprise fertile fuel or a mixture of a fissile and fertile fuel material, such as uranium 235, uranium 238, and thorium, in appropriate mixture. The fuel constituents are preferably mixed together in discrete particulate form and then compacted by known procedures. Such fuel constituents may be present as the metal, the oxide, the carbide or other suitable forms or mixtures thereof. In the preparation of the fuel compact for the embodiment set forth in FIGURE 1 of the accompanying drawings, carbon is also present in the compact, either added separately or combined with the fuel as a carbide, or both. The fuel compact 5 of FIGURE 1 should contain an amount of carbon sufficient to form with zirconium the desired region 9 of zirconium carbide illustrated in FIGURE 1, under controlled carburizing conditions in accordance with the method of the present invention as hereinafter set forth in greater detail. The density and porosity of the fuel compact are such, together with the thickness of the zirconium and the carburization conditions and other factors, that not all of the zirconium will be absorbed and/or converted to zirconium carbide when the zirconium flows during carburization. Instead, a portion of the zirconium will remain as the metal throughout the carburization to form the zirconium region 11 illustrated in FIGURE 1.

Figure 2:
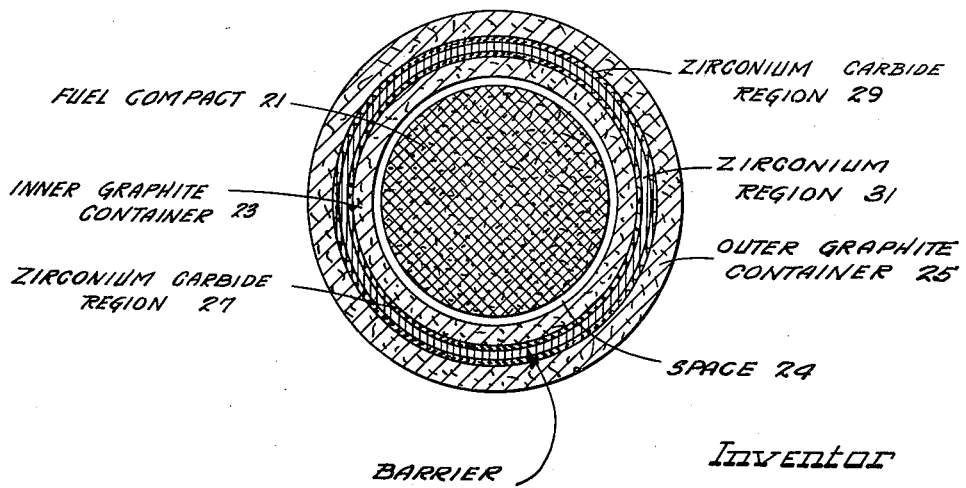
FIGURE 2 is a schematic representation of a sectional view taken transversely of the longitudinal axis of a nuclear fuel element embodying certain features of the present invention.

The fuel compact may be fabricated into any suitable size and shape, for example, it may be cylindrical as illustrated in FIGURE 1 and also in the drawings accompanying copending United States application, Serial No. 753,950. Alternatively, it may be rectangular, cubodial, or spherical, the latter as illustrated in FIGURE 2 of the accompanying drawings. Other shapes for the fuel compact are also contemplated.

The size of the fuel compact is regulated so that at least one and preferably a plurality of the compacts are disposed within a single fuel element.

In accordance with the method of the present invention, the fuel compact 5 illustrated in FIGURE 1 is disposed within a suitably shaped and dimensioned hollow cylindrical sleeve of zirconium metal which tightly fits around the compact. The metal is of any suitable thickness, for example, from about 10 to about 40 mils, so that under the treatment conditions it will not be wholly absorbed. Circular zirconium metal and plates of the same thickness may be applied to the ends of the sleeve, as by welding, brazing or the like, so that the fuel compact is completely sheathed and sealed within the closely fitting layer or shell of zirconium metal.

The fuel compact 5 while encased in the closed sheath of zirconium metal is disposed within a snugly fitting, suitably shaped and dimensioned container 15. The container 15 is hollow and generally cylindrical in form and is fabricated from graphite. Circular end caps may be fitted to the ends of the container and sealed thereto, as by brazing or other sealing treatment, preferably with an "impermeabilizing" compound or the like so as to effectively enclose the sheathed compact within the graphite container. The outer surface of the zirconium metal sheath contacts the inner surface of the graphite container 15 and the inner surface of the zirconium metal sheath contacts the outer surface of the fuel compact 5. The container 15 preferably is relatively thin, for example, about 1/8 inch in thickness, strong and relatively non-porous, that is, constructed of graphite having a reduced permeability to the passage therethrough of fission products. The reduced permeability of the container 15 is preferably provided by treatment thereof in accordance with any one or more of the methods set forth in the previously described copending United States applications.

The next step in the method of the present invention in the fabrication of the embodiment of FIGURE 1 comprises brazing and fusing the zirconium in-situ so as to carburize the same between the graphite container 15 and the carbon-containing fuel compact 5, thereby forming the desired barrier zone of zirconium carbide-zirconium-zirconium carbide. The carburization may be carried out at any suitable temperature for the zirconium, for example, between about 1800° C. and about 1900° C. and over a suitable period of time. The treatment time will necessarily vary, depending upon the treating temperature and other conditions. The carburization of the zirconium is carried out in a substantially oxygen-free atmosphere, preferably under a vacuum or in an inert atmosphere. For example, the carburization may take place in evacuated chamber in an electric furnace. Under such conditions the formation of undesired compounds at the elevated temperatures required for carburization is substantially avoided.

When the compact-zirconium sheath-graphite container assembly has reached the carburization temperature for the zirconium, the zirconium metal fuses and flows, wetting the inner surface of the graphite container and the outer surface of the fuel compact. While the assembly is maintained at the indicated carburization temperature, carbon from the fuel compact 5 combines with zirconium to form the zirconium carbide region 9 of FIGURE 1, and at the same time carbon from the container 15 combines with zirconium to form the zirconium carbide region 13. However, as previously indicated, a portion of the zirconium metal from the zirconium sheath is neither absorbed by the compact or container nor converted to the carbide but, instead, is retained as the metal in a separate region 11 between the two zirconium carbide regions 9 and 13, as illustrated in FIGURE 1. The zirconium carbide-zirconium-zirconium carbide regions together form the desired barrier zone 7 between and integral with the fuel compact 5 and the graphite container 15.

During formation of the desired barrier zone 7, the zirconium metal flows on the surface of and to some extent diffuses into and permeates below the surface of the fuel compact and the inner surface of the graphite container 15, so that the zirconium carbide regions 9 and 13 which are formed extend to some degree below the surface of the fuel compact 5 and the inner surface of the graphite container 15, respectively. The newly formed zirconium carbide regions 9 and 13 have the effect of integrally bonding the zirconium metal region 11 to the fuel compact 5 and to the graphite container 15 so that the components of the fuel compact-barrier zone-container 15 assembly are firmly interconnected.

Subsequent to the carburizing step, the indicated assembly is allowed to cool to room temperature and is ready for final assembly within the outer graphite shell 17 illustrated in FIGURE 1. Preferably, the outer shell 17 is loosely disposed around the container 15 to provide room for thermal expansion during use of the fuel element in a nuclear reactor core. Also, the shell 17 is preferably fabricated of graphite which has been pretreated to reduce fission product transmission, the pretreatment having been carried out preferably in accordance with any one or more of the methods set forth in the previously described copending United States applications. The outer shell 17 is preferably dimensioned to receive a plurality of containers 15, each of which is provided with its associated fuel compact 5 and barrier zone 7. Such a plurality of containers 15 may, for example, be disposed in a stacked relation, as illustrated in FIGURE 1.

The remainder (not shown) of the fuel element 4 may be of any suitable size and shape, for example, such as set forth in copending United States application, Serial No. 753,950, preferably of such design so as to facilitate assembly of the fuel element into the nuclear reactor core. The fuel element 4 may also be provided with a fission product trapping system (not shown) such as is also described and illustrated in copending United States application, Serial No. 753,950. Such trapping system is provided for removing from the space between the outer shell 17 and the plurality of inner containers 15 any small percentage of fission products which may pass into such space from the fuel compacts and through the respective barrier zones 7 and inner containers 15.

However, for most purposes the barrier zone 7 is effective as a strong deterrent to the migration of fission products from the fuel compact 5 to the indicated space. The two zirconium carbide regions provided in accordance with the present invention are relatively non-porous and have a greatly reduced permeability to the passage of volatilized and/or diffusible fission products in contrast to the usual types of graphite and to the fuel compact itself. Moreover, the two zirconium carbide regions within the barrier zone are rendered more effective by their relative position within the fuel element, particularly since the region of zirconium metal is disposed therebetween. As previously indicated, the centrally located zirconium metal region 11 serves as a reservoir of material for sealing cracks and forming zirconium carbide to protect the barrier zone against operational failure. Moreover, the zirconium metal of the region 11 imparts, at the usual operating temperatures for the fuel element, improved elasticity to the construction so as to render the fuel element more durable.

For most purposes, it is desirable to have the fuel compact loosely disposed within the graphite inner container rather than integrally bonded thereto, as in the embodiment set forth in FIGURE 1. The embodiment illustrated in FIGURE 2 has the fuel compact loosely disposed within an inner graphite container so as to provide for differential expansion between the fuel compact and the inner graphite container without danger of cracking either of these components during operation of the fuel element. The fuel compact 21 illustrated in FIGURE 2 may be of any desired size and shape and is substantially as previously described in connection with the fuel compact illustrated in FIGURE 1. However, the fuel compact 21 as shown in FIGURE 2 is spherical rather than cylindrical. Moreover, the fuel compact 21 need not contain carbon, at least from the standpoint of forming zirconium carbide, inasmuch as a separate graphite container is provided on each side of a zirconium sheath so as to form the necessary sources of carbon for the carburizing reaction. It should be understood, however, that, if desired, the fuel compact 21 may contain carbon in the form of fuel carbide or separately added carbon, or both. The fuel compact 21 is loosely disposed within a hollow spherical inner graphite container 23 which is preferably constructed of structural graphite having reduced permeability to passage of fission products. The inner graphite container 23 is substantially identical, except for shape, with the inner container 15 described in connection with the embodiment illustrated in FIGURE 1.

In assembling the embodiment illustrated in FIGURE 2 in accordance with the method of the present invention, the inner container 23 may be initially in the form of two matching hollow hemispheres. For example, the spherical compact 21 may be disposed within one hemisphere and the remaining hemisphere may be positioned and sealed, preferably with an "impermeabilizing" and sealing compound, to the first hemisphere to thereby form the spherical shell of the inner carbide container 23 around the compact 21 and so as to leave a space 24 therebetween.

A similar procedure may be utilized, if desired, to position a snugly fitting shell of zirconium metal on the outer surface of the inner graphite container 23, that is, a thin shell of zirconium metal substantially identical, except in shape, with that described in connection with the embodiment illustrated in FIGURE 1 may be composed of two matching hollow hemispheres. The graphite container 23 completely enclosing the fuel compact 21 may be positioned within one hemisphere of zirconium metal and the remaining hemisphere of zirconium may then be fitted and sealed tightly, as by brazing from about 1800° C., to about 1900° C., to the first described hemisphere to form the desired enveloping zirconium shell.

The second or outer container 25 may then be tightly disposed over the outer surface of the zirconium shell in any suitable manner, preferably in the manner described for the inner graphite container and zirconium shell. The outer graphite container 25 is preferably of structural graphite reduced in permeability to the passage of fission products by one or more of the previously described methods.

It should be understood that other methods of disposing the inner and outer graphite shells and the intermediate zirconium shell around the fuel compact can be utilized, as are within the skill of those versed in the art.

An assembly is thereby provided which comprises the fuel compact 21 within a supporting structure composed of an inner shell of graphite, an intermediate shell of zirconium metal and an outer shell of graphite, the three shells being tightly fitted together.

As the next step in the method of the present invention, the assembly is subjected to carburizing for the zirconium under conditions substantially as previously described in connection with the embodiment illustrated in FIGURE 1, that is, carburization temperature, for example, from about 1800° C. to about 1900° C., over a suitable interval of time and in a suitable atmosphere, for example, a vacuum or inert atmosphere or hydrogen.

The carburization is controlled to cause the zirconium metal to flow over the outer surface of the inner graphite container 23, and to some extent, penetrate that outer surface, zirconium carbide being formed in the region 27 at the surface and, to some extent, within the body of the container 23. The zirconium carbide region 27 integrally bonds the zirconium metal to the container 23.

The zirconium metal similarly flows on to the inner surface of and to some extent penetrates into the body of the outer graphite container 25 adjacent its inner surface, forming with the carbon thereof zirconium carbide in the region 29. The zirconium carbide region 29 integrally bonds the zirconium metal to the container 25.

It should be understood that the carburization conditions are controlled, together with the thickness of the zirconium shell and the porosity of the graphite containers 23 and 25, so as to retain a portion of the zirconium in the metal form during the carburization, whereby a zirconium region 31 between the zirconium carbide region 29 and the zirconium carbide region 27 is provided, constituting with the described two zirconium carbide regions the desired barrier zone 33.

Accordingly, the finished assembly illustrated in FIGURE 2 comprises the fuel compact 21 loosely disposed within a shell comprising an inner graphite container 23, a zirconium carbide region 27, a zirconium region 31, a second zirconium carbide region 29, and an outer graphite container 25, the constituents being firmly interconnected.

One or more of the assemblies set forth in FIGURE 2 may be utilized per se as the fuel elements or, alternatively, may be disposed within an outer graphite container (not shown) forming the shell of the fuel element, in which latter instance such graphite shell may be substantially the same as the shell 17 of the embodiment as set forth in FIGURE 1. In such an arrangement, a fission product trapping system may be connected to the space between the assembly or assemblies and the outer shell of the fuel element, as previously described in connection with the embodiment illustrated in FIGURE 1.

As a specific example of the method of the present invention, a fuel compact apprroximately 2 inches in diameter and 7 inches long and comprising an effective mixture of particulate uranium-235 carbide, uranium-238 carbide and graphite is cold pressed and cold rolled to the desired finished cylindrical shape and is wholly sheathed within a 30 mil thick shell of zirconium metal, in the previously described manner. A 1/8" thick low permeability cylindrical graphite container is then disposed around the zirconium sheath in a similar manner to wholly enclose the sheath, after which the assembly is heated rapidly in an electric furnace to 1850° C. and maintained at that temperature under a blanket of argon gas until carburization has proceeded to establish the two previously described zirconium carbide regions, one zirconium carbide region between and as a portion of the fuel compact and zirconium metal region and the other zirconium carbide region between and as a portion of the zirconium metal and graphite container. The assembly is then allowed to cool to room temperature and is stacked with a plurality of identical assemblies identically treated, within an outer graphite container defining the shell of a nuclear fuel element. A plurality of such fuel elements are aligned within a nuclear reactor core for improved operation with reduced migration of fission products from the respective compacts.

Figure 3:
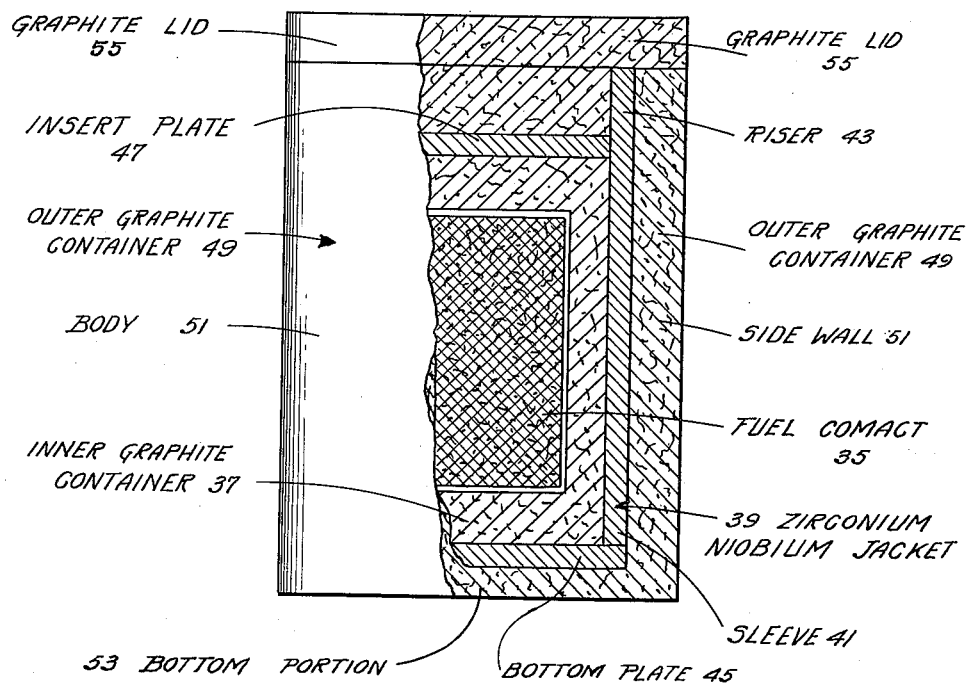
FIGURE 3 is a schematic representation of a vertical section of a further embodiment of the fuel element of the present invention before the carburizing step.

A further embodiment incorporating various features of the present invention is illustrated in FIGURE 3 of the accompanying drawings, FIGURE 3 being a vertical section of a portion of a fuel element prior to the carburizing step.

In FIGURE 3, a fuel compact 35 of generally vertically extending cylindrical shape is illustrated, wholly around which is loosely disposed a suitably dimensioned, generally cylindrical inner graphite container 37. Snugly disposed around the entire outer surface of the container 37 is a jacket 39 of metal comprising an eutectic mixture of zirconium and niobium, the niobium being present in a minor proportion by weight.

The jacket 39 includes a generally vertically extending hollow sleeve 41 which tightly encloses the side walls of the inner graphite container 37. The sleeve 41 is substantially longer than the inner container 37 and is positioned around the inner container 37 so as to provide an upper riser portion 43 which extends above and beyond the upper end of the container 37, as illustrated in FIGURE 3. The bottom of the container 37 is substantially co-planar with the bottom of the sleeve 41. There is also provided a bottom closure plate 45 of the eutectic mixture of zirconium and niobium, which plate extends generally horizontally across the bottom of the sleeve 41 and is sealed thereto, as by brazing or the like, so as to close off the bottom of the jacket 39 and so as to closely abut the bottom of the inner container 37.

Moreover, an insert plate 47 of the described eutectic mixture is disposed generally horizontally and closely abutting the top of the inner container 37, as illustrated in FIGURE 3. Insert plate 47 is sealed along its periphery to the adjacent portion of the inner surface of sleeve 41 so that the inner container 37 is completely sealed within and encased in the metal jacket 39.

Snugly fitting around the outer surface of the jacket 39 and wholly enclosing the same is an outer graphite container 49 comprising a generally cylindrical side wall portion 51 integrally connected at its lower end to a bottom portion 53 and fitted at its upper end with a graphite lid 55 which is sealed thereto, as by the use of an impermeabilizing substance, etc., as previously described in connection with the constructions illustrated in FIGURES 1 and 2 of the accompanying drawings.

In fabricating the construction illustrated in FIGURE 3, the fuel compact 35 may be loosely disposed within the inner graphite container 37. For this purpose, the inner graphite container 37 may, of course, comprise a plurality of components readily assemblable around the compact. For example, the graphite container 37 may include a hollow cylinder with integral bottom and removable top (not shown) or any other suitable means for facilitating sealing of the compact 35 within the container 37.

After the fuel compact is loosely disposed and wholly enclosed within the inner graphite container 37, as described, the metal jacket 39 may be assembled around the inner graphite container from a plurality of components so as to tightly and wholly enclose the container 37. For example, the sleeve 41 may first be disposed around the container 37, after which the bottom plate 45 and the top or insert plate 47 may be placed in proper position and sealed, as by brazing or the like, to form the completed jacket 39.

It will be understood that the construction illustrated in FIGURE 3 of the accompanying drawings may, if desired, be suitably fabricated utilizing zirconium metal alone instead of the eutectic mixture of zirconium and niobium for the jacket 39. Thereafter, the fuel element assembly may be disposed within the closely fitting outer graphite container 49. For example, the side wall 51 and the integral bottom portion 53 may be positioned around the jacket 39 after which the graphite lid 55 may be sealed into place to complete the construction.

The fully assembled construction illustrated in FIGURE 3 is not in finished form inasmuch as a carburizing step must be carried out thereon to convert the metal jacket 39 into a fission product-barrier zone, in accordance with the present invention.

The carburizing step may be carried out as previously indicated and under any suitable temperature and other operating conditions. For example, when the zirconium-niobium mixture is utilized for the jacket 139, the zirconium may be present, for example, in a concentration of about 80 percent by weight, the remainder of the mixture constituting the niobium.

Carburizing may be effectively carried out at a temperature of approximately 1900° C., as well as at other suitable temperatures, so that the desired three-region barrier zone is readily formed in situ in the construction illustrated in FIGURE 3 by reaction of the eutectic mixture with graphite. In this connection, two regions of carbides are formed, separated by an intermediate region constituting the eutectic mixture of zirconium and niobium metals. Each carbide region comprises a mixture of zirconium carbide and niobium carbide, one of such regions being at and adjacent to the interface of jacket 39 and container 37. The other of such carbide regions is at the interface and adjacent to the interface of jacket 39 and container 49.

The construction illustrated in FIGURE 3 of the accompanying drawings has a particular advantage with respect to the ease of formation of the desired three-region barrier zone during the carburizing step. In this connection, each riser 43 is connected to and may be a separate unit or integral with the main body of the intermediate region. Each riser 43 acts as a reservoir of zirconium metal or eutectic mixture of zirconium and niobium metals outside the main body of jacket 39. Accordingly, the carburizing can be carried out with less likelihood of providing in the barrier zone an intermediate region which is of greatly reduced thickness or which does not completely enclose the inner graphite container. In this connection, during the carburizing step a certain amount of the metal of the jacket 39 flows and is absorbed into the adjacent inner and outer graphite containers. Such metal reacts within said containers to form the desired carbides. Too much absorption of the metal from the jacket, due to, for example, a too extensive treatment time or too high porosity of graphite, etc., would result in a substantial narrowing of the desired intermediate region of metal. Where, for example, the carburizing is carried out while the construction is maintained in a relatively fixed position, the metal of the intermediate layer has a tendency to gravitate to the lower portions of the construction as space becomes available therein, due to the described metal absorption from the intermediate region. This further tends to thin the upper areas of the intermediate region, at least where a reservoir of metal outside the main body of the enclosing jacket is not provided. In extreme cases, metal absorption by the graphite could be so extensive as to completely remove the metal of the intermediate region from at least a portion of the upper area of that region. Accordingly, the carbide-metal-carbide barrier zone would not entirely enclose the inner graphite container in the desired manner.

However, with the construction illustrated in FIGURE 3, even though appreciable absorption of the metal from the intermediate regions occurs during carburizing, the reservoir of metal represented by the risers 43 acts to protect such intermediate region against undue thinning by replenishing the metal of the main body of the intermediate region as needed. In this connection, as metal is absorbed from the main body of the intermediate region into the surrounding graphite, metal from the risers flows into the main body of the intermediate region to replace the absorbed metal.

Accordingly, the carburizing step of the present method can be carried out on the construction illustrated in FIGURE 3 with a greater latitude regarding the thickness of jacket 39 and porosity of the graphite containers and more flexibility in the operating temperature, time and other factors, while still providing a satisfactory product having a sufficiently thick intermediate layer wholly enclosing the inner graphite container.

It will be understood that the risers 43 illustrated in FIGURE 3 can be readily and effectively utilized in other embodiments of the fuel element construction of the present invention to facilitate the described carburizing step.

Accordingly, an improved fuel element is thereby provided, together with the method of forming the same. The fuel element includes means for improved retention of fission products within the fuel element. The improved means include a barrier zone comprising a zirconium carbide-containing region, a zirconium-containing region, and a zirconium carbide-containing region, the barrier zone being interposed in the path of migration of fission products from the nuclear fuel.

The barrier zone imparts improved durability, improved safety against cracking during operation of the fuel element and other advantages to the fuel element, as set forth in the foregoing.

Such modifications in the method of the present invention, in the materials, equipment and steps for carrying out the method, and in the products thereof, including the components and their manner of assembly, as are within the skill of those versed in the art are contemplated as being within the scope of the present invention.

I claim:

1. An improved fuel element for a neutronic reactor, said fuel element comprising a fuel compact and a barrier zone associated therewith and disposed along the path of migration of fission products from said fuel compact, said barrier zone comprising a plurality of zirconium carbide-containing regions separated from each other by interposed zirconium metal-containing regions bonded thereto, and a graphite supporting structure connected to said barrier zone, said barrier zone being effective to substantially retard the passage of fission products therethrough.

2. An improved fuel element for a neutronic reactor, said fuel element comprising a fuel compact and a barrier zone associated therewith and wholly disposed around said compact, said barrier zone comprising a plurality of zirconium carbide-containing regions separated from one another by interposed zirconium metal-containing regions bonded thereto, and a graphite supporting structure connected to said barrier zone said barrier zone being effective to subsequently retard the passage of fission products therethrough.

3. An improved fuel element for a neutronic reactor, said fuel element comprising a fuel compact, a barrier zone integrally connected to said compact and wholly disposed around said compact, and a graphite supporting structure connected to said barrier zone, said barrier zone comprising a plurality of zirconium carbide-containing regions separated from one another by interposed zirconium metal-containing regions bonded thereto, said barrier zone being effective to substantially retard the passage of fission products therethrough.

4. An improved fuel element for a neutronic reactor, said fuel element comprising a centrally disposed fuel compact, a barrier zone surrounding, enclosing and integrally connected to said compact, said barrier zone comprising an inner region of zirconium carbide integrally connected to said compact, an intermediate region of zirconium metal integrally connected to said inner zirconium carbide region, and an outer region of zirconium carbide integrally connected to said zirconium metal region, a graphite supporting shell also being provided, said graphite shell being integrally connected to said outer zirconium carbide region, said barrier zone being effective to substantially retard the passage of fission products from said compact.

5. An improved fuel element for a neutronic reactor, said fuel element comprising a centrally disposed fuel compact, a barrier zone surrounding, enclosing and integrally connected to said compact, said barrier zone comprising an inner region of zirconium carbide and niobium carbide integrally connected to said compact, an intermediate region of zirconium metal and niobium metal in eutectic mixture integrally connected to said inner zirconium carbide- and niobium carbide-containing region, and an outer region of zirconium carbide and niobium carbide integrally connected to said zirconium- and niobium metal-containing region, a graphite supporting shell also being provided, said graphite shell being integrally connected to said outer zirconium carbide- and niobium carbide-containing region, said barrier zone being effective to substantially retard the passage of fission products from said compact.

6. An improved fuel element for a neutronic reactor, said fuel element comprising a fuel compact loosely disposed within an enclosing inner graphite supporting structure, said graphite supporting structure in turn being enclosed within a barrier zone comprising successive protective layers including an inner region of zirconium carbide integrally connected to the outer area of said graphite supporting structure, an intermediate region of zirconium metal integrally connected to said inner zirconium carbide region, and an outer zirconium carbide region integrally connected to said region of zirconium metal, said barrier zone being integrally connected to an outer graphite supporting structure enclosing said barrier zone through said outer zirconium carbide region, said barrier zone being effective to substantially retard the passage of fission products therethrough.

7. An improved fuel element for a neutronic reactor, said fuel element comprising a fuel compact loosely disposed within an enclosing inner graphite supporting structure, said graphite supporting structure in turn being enclosed within a barrier zone comprising successive protective layers including an inner region of zirconium carbide and niobium carbide integrally connected to the outer area of said graphite supporting structure, an intermediate region of zirconium and niobium in eutectic mixture integrally connected to said inner zirconium carbide and niobium carbide region, and an outer region of zirconium carbide and niobium carbide integrally connected to said region of zirconium and niobium metal, said barrier zone being integrally connected to an outer graphite supporting structure enclosing said barrier zone through said outer zirconium carbide and niobium carbide region, said intermediate region being connected to a reservoir comprising an eutectic mixture of zirconium and niobium, whereby metal absorbed from said intermediate region into said graphite is replaced with metal from said reservoir, said barrier zone being effective to substantially retard the passage of fission products therethrough.

8. An improved fuel element for a neutronic reactor, said fuel element comprising a fuel compact loosely disposed within an inner graphite supporting structure, said inner graphite supporting structure in turn being wholly enclosed within a barrier zone comprising successive protective interconnected layers including an inner region comprising zirconium carbide integrally connected to the outer area of said inner graphite supporting structure, an intermediate region comprising zirconium metal integrally connected to said zirconium carbide region, and an outer region comprising zirconium carbide integrally connected to said intermediate region, said barrier zone being integrally connected to an outer graphite supporting structure enclosing said barrier zone through said outer region comprising zirconium carbide, said intermediate region being connected to a reservoir comprising zirconium metal, whereby metal absorbed from said intermediate region into said graphite is replaced with metal from said reservoir, said barrier zone being effective to substantially retard the passage of fission products therethrough.

9. A method of fabricating an improved fuel element for a neutronic reactor, which comprises the steps of disposing a layer of zirconium metal on the surface of and completely enclosing a carbon-containing fuel compact for a neutronic reactor, enclosing said zirconium metal layer within a tightly fitting supporting structure of graphite, heating the compact-zirconium metal layer-graphite assembly to at least the carburizing temperature of said zirconium and lower than the melting point of zirconium carbide in an inert atmosphere for a time sufficient to establish a region of zirconium carbide adjacent the interface between said compact and said zirconium metal layer, and a second zirconium carbide region adjacent the interface between said graphite supporting structure and said layer while retaining an intermediate region of zirconium metal between said regions of zirconium carbide, whereby a barrier zone against the migration of fission products from said fuel compact is formed, and thereafter cooling said assembly to ambient temperature.

10. A method of fabricating an improved fuel element for a neutronic reactor which comprises the steps of disposing a jacket of metal comprising an eutectic mixture containing a major proportion of zirconium and a minor proportion of niobium on the surface of and completely enclosing a carbon-containing fuel compact for a neutronic reactor, enclosing said metal jacketed compact within a tightly fitting supporting structure of graphite, heating the compact-metal jacket-graphite assembly to a temperature of about 1800 to 1900° C. in an inert atmosphere for a time sufficient to establish a region of zirconium carbide and niobium carbide adjacent the interface between said compact and said metal jacket and a second zirconium carbide and niobium carbide region adjacent the interface between said graphite supporting structure and said metal jacket while retaining an intermediate region of zirconium and niobium metal in eutectic mixture between said regions of carbide formation, whereby a barrier zone against the migration of fission products from said fuel compact is formed, and thereafter cooling said assembly to ambient temperature.

11. A method of fabricating an improved fuel element for a neutronic reactor, which comprises the steps of loosely disposing a graphite supporting structure around a fuel compact for a neutronic reactor, disposing over the outer surface of and completely enclosing said graphite supporting structure a layer of zirconium metal, disposing over the outer surface of said layer of zirconium metal a second graphite supporting structure, carburizing the fuel compact-graphite structure-zirconium metal layer-graphite structure assembly at a temperature above the brazing temperature for said zirconium metal and less than the melting temperature of zirconium carbide in an inert atmosphere for a period of time sufficient to provide a barrier zone comprising zirconium carbide regions adjacent the interfaces between said graphite structure and said zirconium layer while retaining an intermediate region of zirconium metal between said regions of zirconium carbide, said barrier zone being effective to substantially retard the passage therethrough of fission products from said compact, and thereafter cooling said assembly to room temperature.

12. A method of fabricating an improved fuel element for a neutronic reactor, which comprises the steps of loosely disposing an inner graphite supporting structure around a fuel compact for a neutronic reactor, disposing over the outer surface of and completely enclosing said inner graphite supporting structure a jacket of metal comprising an eutectic mixture of a major proportion of zirconium and a minor proportion of niobium, not in excess of approximately 20 percent by weight, a reservoir of metal comprising said eutectic mixture being connected to said jacket, whereby metal absorbed from said jacket is replaced by metal from said reservoir, disposing over the outer surface of said jacket and reservoir an outer graphite supporting structure, carburizing the fuel compact-inner graphite structure-metal jacket and reservoir-outer graphite structure assembly at a carburizing temperature of about 1800 to 1900° C. in an inert atmosphere for a period of time sufficient to provide a barrier zone, said barrier zone comprising a region of zirconium carbide and niobium carbide adjacent to and integrally bonded to said inner graphite structure, an intermediate region of said eutectic mixture integrally bonded to the outer surface of said region of carbide formation and also to the inner surface of a second region of zirconium carbide and niobium carbide, said latter region of carbide formation being integrally bonded to the inner surface of said outer graphite supporting structure, said barrier zone being effective to substantially retard the passage therethrough of fission products from said compact, and thereafter cooling said assembly to ambient temperature.

References Cited in the file of this patent

UNITED STATES PATENTS

| | | |
|---|---|---|
| 2,597,963 | Winter | May 27, 1952 |
| 2,597,964 | Winter | May 27, 1952 |
| 2,711,980 | De Santis et al. | June 28, 1955 |
| 2,788,460 | De Santis et al. | Apr. 9, 1957 |
| 2,822,301 | Alexander et al. | Feb. 4, 1958 |
| 2,866,724 | Alexander | Dec. 30, 1958 |
| 2,907,705 | Blainey | Oct. 6, 1959 |
| 2,910,379 | Gurinsky | Oct. 27, 1959 |

OTHER REFERENCES

AEC document TID-7530 (pt. 1), April 1957, pages 2–3.

Second United Nations International Conference on the Peaceful Uses of Atomic Energy, vol. 6, pp. 379–383.